United States Patent [19]
Bostica et al.

[11] Patent Number: 6,067,334
[45] Date of Patent: May 23, 2000

[54] DEVICE FOR AND METHOD OF ALIGNING IN TIME DIGITAL SIGNALS, FOR EXAMPLE A CLOCK SIGNAL AND DATA STREAM

[75] Inventors: Bruno Bostica, Pino Torinese; Marco Burzio, Gruglisco; Paolo Pellegrino, Turin, all of Italy

[73] Assignee: Cselt- Centro Studi E Laboratori Telecomunicazioni S.p.A., Turin, Italy

[21] Appl. No.: 08/869,936

[22] Filed: Jun. 5, 1997

[30] Foreign Application Priority Data

Jul. 31, 1996 [IT] Italy ................... TO96A0665

[51] Int. Cl.[7] ................. H03D 3/24; H03L 7/00
[52] U.S. Cl. ....................... 375/373; 327/153
[58] Field of Search ................... 375/355, 362, 375/371, 373; 327/141, 144, 153, 161; 371/47–1

[56] References Cited

U.S. PATENT DOCUMENTS 5,528,637  6/1996  Sevenhans et al. ............ 375/371
5,610,953  3/1997  Betts et al. ..................... 375/373
5,689,530  11/1997  Honaker ......................... 375/286

*Primary Examiner*—Stephen Chin
*Assistant Examiner*—Albert Park
*Attorney, Agent, or Firm*—Herbert Dubno

[57] ABSTRACT

A device and a method for aligning in time two essentially isochronous digital signals are provided, in which a plurality (2″) of replicas (CK1–CK4) of the first signal (CKIN), separated by a given phase difference, are generated and a number of said replicas (CK3, CK4) is subjected to sampling (4, 5) in correspondence with the rising edges of the second signal (DATA). As the result of the sampling, a combination of logic signals (SL0, SL1) is obtained which is representative of the phase relation existing between each of said replicas (CK1–CK4) and the second signal (DATA). The output signal (CKOUT) of the device, aligned with the second signal, corresponds to the one, among the replicas (CK1–CK4) of the first signal, which best reproduces the desired alignment condition.

30 Claims, 3 Drawing Sheets

DEVICE FOR AND METHOD OF ALIGNING IN TIME DIGITAL SIGNALS, FOR EXAMPLE A CLOCK SIGNAL AND DATA STREAM

FIELD OF THE INVENTION

The present invention relates to a method of and to a device for aligning in time, i.e. placing in a predetermined phase relationship, two essentially isochronous digital signals.

More particularly, the invention relates to the problem of aligning a clock signal, locally generated in a data processing apparatus, with a stream of data, such as NRZ data, arriving at the input of the apparatus. The invention is not, however, limited to this particular application since the invention applies, in general, to the problem of aligning essentially isochronous digital signals of any nature. The reference to "essentially" isochronous signals means that, particularly in the preferred embodiments, the invention allows for possible drift, jitter, and other disturbances which can affect the frequency of the signals involved.

BACKGROUND OF THE INVENTION

A technique conventionally adopted to align in time two signals (for instance a carrier modulated by an information signal and a local oscillator signal used to demodulate the information signal conveyed on the aforesaid carrier) is the one known by the acronym PLL (Phase Locked Loop). However, this technique, especially in its more sophisticated implementations, is scarcely suitable for use with elementary, or simple, digital circuits, particularly when the circuits are to be manufactured and used in large quantities, with the subsequent need to contain the complexity and costs associated with individual circuits.

OBJECT OF THE INVENTION

The object of the present invention is to provide a device and a method for the alignment of digital signals which can be accomplished in a simple form, at reduced costs, without however negatively affecting final performance.

According to the present invention, this purpose is achieved in a device for the time alignment of a first (CKIN) and a second (DATA) essentially isochronous digital signals which comprises:

phase shifting means arranged to generate a set of replicas (CK1–CK4) of the first digital signal, the replicas (CK1–CK4) being separated from one another by given phase differences;

sampling means activated by the second digital signal (DATA) and arranged to detect, in correspondence with given transitions of said second digital signal (DATA), the logic values taken by at least a subset of said replicas (CK1–CK4) and to generate a respective combination of logic signals (SL0, SL1); and first selecting means which receive as inputs the replicas (CK1–CK4) of the first digital signal and which are activated to select one of the replicas (CK1–CK4), identified starting from the combination of logic signals (SL0, SL1), as an output signal (CKOUT) aligned in time with the second digital signal (DATA).

The sampling means can be arranged to detect the logic values taken by a subset (CK3, CK4) of the replicas (CK1–CK4) entropically representative of the whole set of replicas (CK1–CK4). The logic signals (SL0, SL1) can correspond to the values assumed by the replicas (CK3, CK4) of the subset. The first digital signal (CKIN) can be a clock signal and the phase shifting means can generate a plurality of replicas (CK1–CK4) of the clock signal separated by identical phase differences. The second digital signal (DATA) can be a data signal and the sampling means can be activated by the rising edges of the second digital signal (DATA).

According to the invention, the second digital signal (DATA) can be an NRZ signal and the operation of the sampling means can be enabled in correspondence with transitions of the second digital signal (DATA) towards the level different from 0. The first selecting means can be so configured as to select, as the output signal (CKOUT), the replica (CK1–CK4) having a respective transition in an essentially central position with respect to the bit period of the second digital signal (DATA).

According to another feature, the first selecting means can comprise a multilexer which receives at its input the replicas (CK1–CK4) and is driven by the logic signals (SL0, SL1). The sampling means can comprise bistable circuits which receive at their input respective replicas (CK3–CK4) of the set and are enabled to operate by the second digital signal (DATA), the outputs of the bistable circuits defining the logic signals (SL0, SL1). The device can comprise processing means arranged to generate a time-offset replica (CKX) of the output signal (CKOUT), as well as transfer circuits enabled by the time-offset replica (CKX) of the output signal (CKOUT) to transfer the logic signals (SL0, SL1) toward the first selecting means so as to modify the choice of the output signal (CKOUT) only in correspondence with a predetermined transition of the time-offset replica (CKX) of the output signal (CKOUT). The processing means can generate a time-offset replica (CKX) of the output signal (CKOUT) which has a phase advance with respect to the output signal (CKOUT). The processing means can alternatively generate a time-offset replica (CKX) of the output signal (CKOUT) which has, with respect to the output signal (CKOUT), an advance equal to the given phase differences.

The transfer circuits can comprise additional bistable circuits which receive a respective one of the logic signals (SL0, SL1) and are enabled by the time-offset replica (CKX) of the output signal (CKOUT), whereby the logic signals (SL0, SL1) are present on the outputs of the additional bistable circuits in combinations which vary only in correspondence with the given transition of the time-offset replica (CKX) of the output signal (CKOUT).

The processing means can comprise second selecting means which receive the replicas (CK1–CK4) in a combination other than that received by the first selecting means.

Hysteresis generating means can be provided to act on the replicas (CK3, CK4) transferred to the sampling means to selectively increase the duration (A) of the time intervals in which the replicas (CK3, CK4) are subjected to the action of the sampling means. The hysteresis generating means can comprise two respective propagation paths toward the sampling means for each replica (CK3, CK4) they act upon, at least one of these paths including phase-shifting means. The device can comprise additional selecting means that are driven starting from the logic signals (SL0, SL1) to selectively activate either of the propagation paths.

Between the sampling means and the first selecting means there can be interposed validation means which, in the presence of a variation of the combination of logic signals (SL0, SL1), allow the propagation of the varied combination of logic signals (SL0, SL1) toward the first selecting means only after the variation has been detected in correspondence with a plurality of consecutive ones of the given transitions of the second digital signal (DATA). The validation means can allow the propagation of the varied combination of logic signals (SL0, SL1) only after the variation has been detected in correspondence with two successive transitions of the second digital signal (DATA). The validation means can comprise a state machine.

The method of aligning in time a first (CKIN) and a second (DATA) essentially isochronous digital signals can comprise the steps of:
generating a set of replicas (CK1–CK4) of the first digital signal (CKIN), the replicas (CK1–CK4) being separated from one another by given phase differences;
detecting, in correspondence with given transitions of the second digital signal (DATA), the logic values taken by at least a subset of the replicas (CK1–CK4), and generating a respective combination of logic signals (SL0, SL1); and
selecting one of the replicas (CK1–CK4) of the first digital signal (CKIN), identified starting from the combination of logic signals (SL0, SL1), as an output signal (CKOUT) aligned in time with the second digital signal (DATA).

The logic values taken by a subset (CK3, CK4) of the replicas entropically representative of the replicas (CK1–CK4) themselves are detected, and the output signal is selected on the basis of the combination of the logic values taken by the replicas (CK3, CK4) of the subset. The first digital signal (CKIN) can be a clock signal, the phase differences can be identical to each other, the second digital signal (DATA) can be a data signal, and the second digital signal (DATA) can be an NRZ signal.

The rising edges of the second digital signal (DATA) are used as given transitions of said second digital signal (DATA). The method of the invention comprises selecting, the output signal (CKOUT), the replica (CK1–CK4) having a respective transition in an essentially central position with respect to the bit period of the data signal (DATA).

The detecting step can further comprise:
feeding at least some of the replicas (CK3, CK4) to respective inputs of sampling circuits (4, 5), and
using the given transitions of the second digital signal (DATA) as a signal for enabling the sampling circuits, whereby the outputs of the sampling circuits define the logic values (SL0, SL1).

The method can also comprise the steps of:
generating a time-offset replica (CKX) of the output signal (CKOUT), and
modifying the choice of the output signal (CKOUT) only in correspondence with a given transition of the time-offset replica (CKX) of the output signal (CKOUT). The time-offset replica (CKX) of the output signal (CKOUT) can be generated as a time-offset replica having a phase advance.

The time-offset replica (CKX) can be generated with a phase advance, with respect to the output signal (CKOUT), essentially equal to the given phase differences. The detecting step can comprise the step of submitting at least the replicas in the subset to a hysteresis function to selectively increase a duration (A) of a time interval allotted to the detecting step. The method can also comprise the steps of:
generating two time shifted versions of each replica (CK3, CK4) submitted to hysteresis and
detecting the logic value of each of the replica starting from either of the time shifted versions, depending on the combination of logic values (SL0, SL1).

The method can comprise the step of modifying the choice of the output signal (CKOUT) only after the detection of a variation of the combination of logic values (SL0, SL1) in correspondence with a plurality of consecutive ones to the given transitions of the second digital signal (DATA). The plurality of transitions can comprise two of the consecutive transitions.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
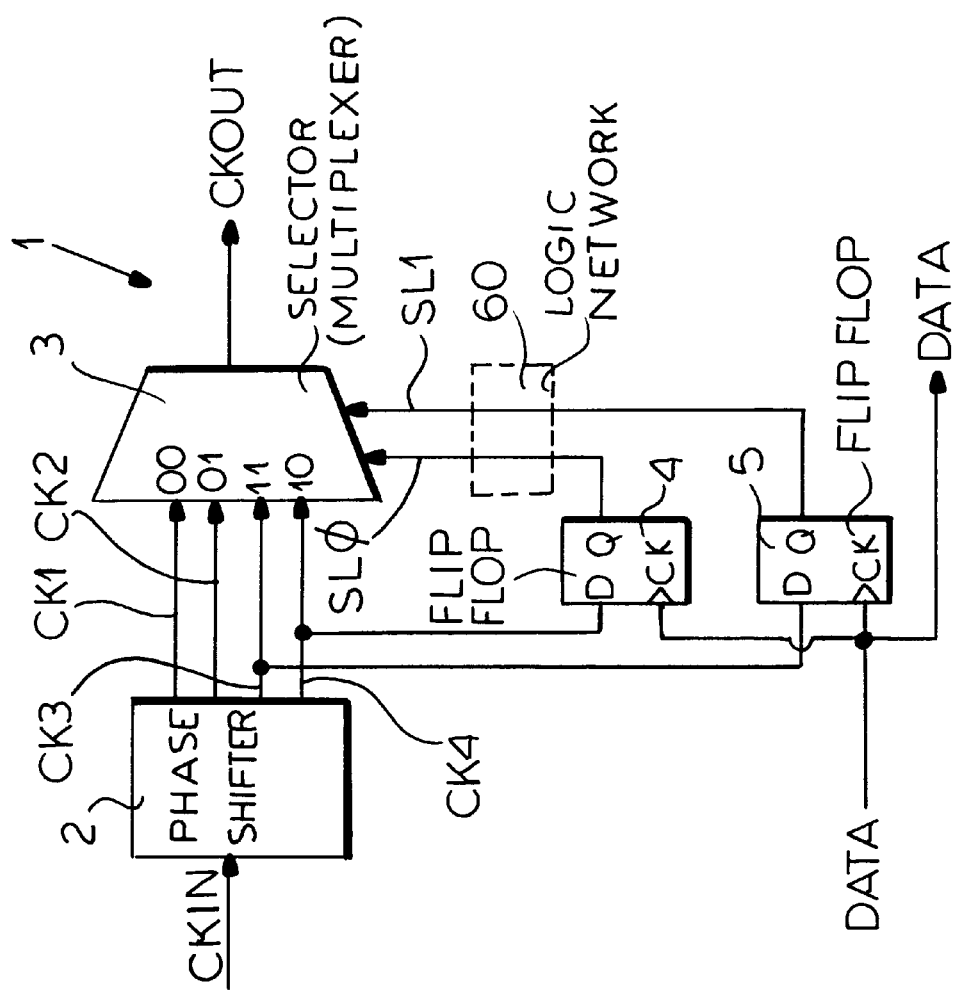
FIG. 1 shows, in block diagram form, the basic operating principle of a device according to the invention.
Figure 3:
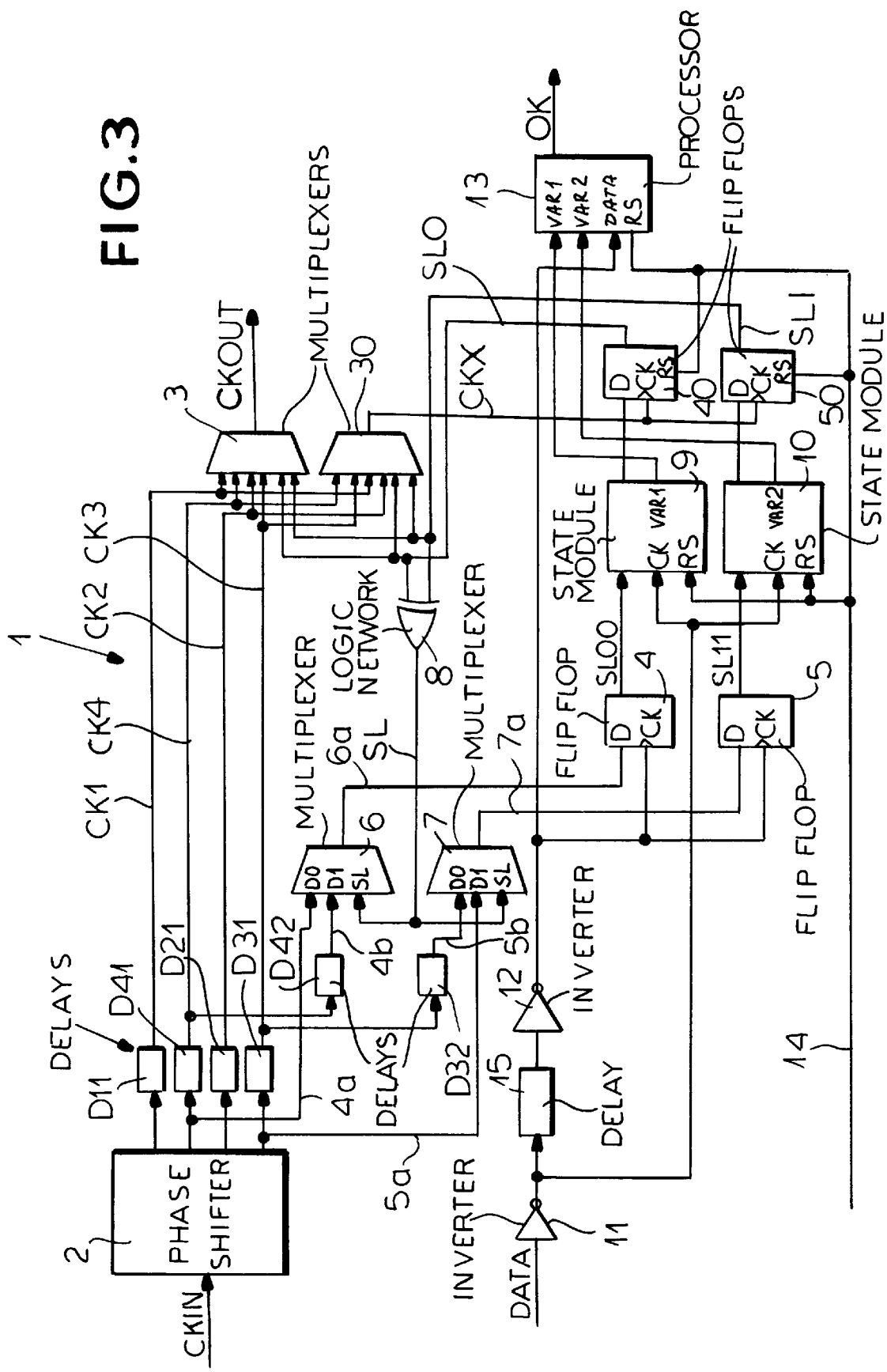
FIG. 3 is a detailed block diagram of a possible embodiment of a device according to the invention.

In FIGS. 1 and 3, reference 1 indicates a device which is to align in time two essentially isochronous digital signals. In the illustrated example, the first signal is a digital clock signal CKIN generated by a digital oscillator of known type (not specifically depicted in the drawings) and having period T. The second digital signal instead is a stream of incoming data (signal DATA) with bit period corresponding to period T of signal CKIN. Device 1 is to generate at its output a clock signal CKOUT which is "time-aligned", i.e. is in a pre-determined phase relationship with respect to signal DATA.

Hereinafter, reference shall be made to a preferred embodiment where the phase relationship sought is such that signal CKOUT has a rising edge (transition from logic level "0" to logic level "1") ideally located at the centre of the bit interval of signal DATA, which has been assumed to be an NRZ signal. This of course is one of many possible choices: a different logic configuration or programming of the elements forming the embodiment according to the invention allows attaining a different alignment, and thus a different phase relationship. It is even possible to configure the device according to the invention in such a way as to allow the alignment condition to be selectively varied, should this be desired for operational purposes.

The incoming clock signal CKIN is fed to the input of a phase shifting module 2 (of known structure) which generates at its output $2^n$ replicas of signal CKIN, separated by a predetermined phase difference (assumed to be constant for all adjacent replicas). In the embodiment illustrated herein by way of example, n=2, so that module 2 generated four clock signals CK1, CK2, CK3 and CK4 separated by a 90° phase difference. As stated previously, module 2 is of a known type: for instance, the four different phases may be obtained starting from a signal at twice frequency generated by a PLL within module 2. It is also evident that, at least in most cases, one of said replicas (for instance, signal CK1) may simply be the incoming signal CKIN. The typical behaviour of signals CK1–CK4 with the respective phase differences is represented in the four time diagrams located at the top of FIG. 2.

The four (or in general $2^n$) replicas CK1, CK2 . . . of signal CKIN generated by module 2 are fed to the input of a selector module 3, normally consisting of a multiplexer, whose function is to transfer to the output of device 1, as output signal CKOUT aligned in time with signal DATA, one of the replicas CK1, CK2 . . . chosen in a way which will be better illustrated further on. Signal CKOUT aligned with the data and signal DATA are then provided to utilization devices, not depicted, where signal DATA can be sampled by using signal CKOUT.

References 4 and 5 indicate two D flip-flops which receive signal DATA at their respective enabling input CK. Flip-flop 4 receives signal CK4 at its input D, whereas flip-flop 5 receives signal CK3 at input D. The signals present on outputs Q of flip-flops 4 and 5, indicated respectively by SL0 and SL1, are fed to the control inputs of multiplexer 3 to cause the selection of one of replicas CK1, CK2 . . . as signal CKOUT. Flip-flops 4 and 5 essentially form a sampling circuit able to detect the state of a subset of signals CK1–CK4 at a predetermined instant, chosen, in the illustrated embodiment, so as to correspond with the rising edge of signal DATA.

Figure 2:
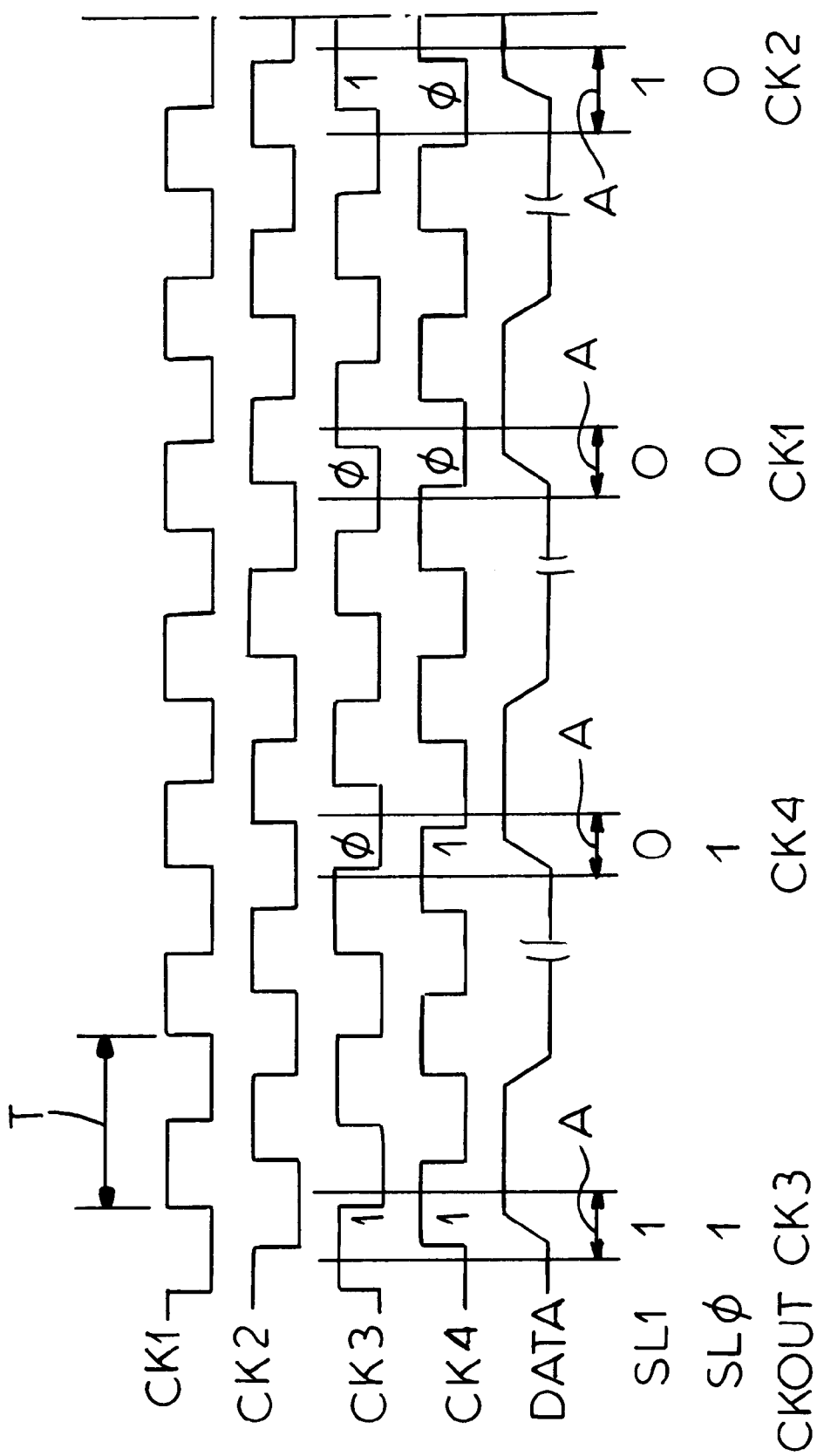
FIG. 2 comprises a number of timing diagrams, referred to a common time scale, which show the behavior of signals present during operation in the circuit shown in FIG. 1.

In FIG. 2, the time diagram corresponding to signal DATA shows four bits, with four different possible time positions of the rising edge. Thus, in the case of the left-most bit, the aforesaid rising edge occurs when signals CK1 and CK2 are 0 and signals CK3 and CK4 are 1. In the case of the rising edge of the second bit, the combination of the logic values of the clock signals is as follows: CK1=1; CK2=0; CK3=0; CK4=1. For the other two bits, the respective combinations are: CK1=1; CK2=1; CK3=0; CK4=0 and CK1=0; CK2=1;CK3=1;CK4=0.

The two lines in FIG. 2 below signal DATA represent the corresponding logic values of signals SL0 and SL1 at the output of flip-flops 4 and 5. Given the association shown in FIG. 1 between signals CK1–CK4 and the inputs of multiplexer 3, the combinations of logic values indicated for SL0 and SL1 determine the selection, as outgoing signal CKOUT, of the signal indicated in the last line of FIG. 2.

Of course, it will be appreciated that the aforesaid logic values of SL0, SL1 are ideally held once a certain phase relationship between signal CKIN and signal DATA has been attained.

In any case it is easy to see how the four possible phase relationships which may exist between replicas CK1–CK4 of signal CKIN and the rising edge of signal DATA can be identified and distinguished in univocal manner on the basis of only two of said replicas. Thus, in the example shown, the sampling circuit comprises two flip-flops 4 and 5 which do not sample the whole set of the replicas CK1–CK4, but only some of them, specifically a subset comprising replicas CK3 and CK4; of course, different choices would be possible, by a different logic configuration of the cascaded elements.

This concept can be generalised to the case of $2^n$ (n=1, 2. . .) replicas. The phase relationship existing with respect to signal DATA can thus be identified (with a degree of discrimination which is the finer the higher the value of $\underline{n}$) starting from a subset comprising $\underline{n}$ such replicas, since the logic values taken by $\underline{n}$ replicas, upon sampling by signal DATA, are indicative of the logic state reached at that moment by the whole set of $2^n$ replicas. With the wording adopted in the claims which follow, it can thus be stated that the selection effected by multiplexer 3 is performed on the basis of a subset of replicas CK1, CK2 . . . comprising a number $\underline{n}$ of replicas "entropically representative" of the whole set of $2^n$ replicas. This wording is used by analogy with the definition of the measure of the "entropy" (information content) of an information source: as known, the entropy of a source which may assume two different logic states is equal to one bit, whereas the entropy associated to a source which may assume four states is equal to two bits and, in general, the entropy associated to a source which may assume $2^n$ states is equal to $\underline{n}$ bits.

In the exemplary embodiment shown in FIG. 1 a direct connection is provided between the outputs of flip-flops 4 and 5 to inputs SL0 and SL1 of multiplexer 3 (that is why the outputs of flip-flops 4 and 5 have been so identified). This choice is advantageous in terms of manufacturing simplicity and corresponds to an alignment condition such that signal CKOUT presents a rising edge roughly at the centre of the bit period of signal DATA. This fact can easily be verified by comparing, in FIG. 2, the various possible behaviours shown for signal DATA with the time behaviour of the signal chosen each time as CKOUT (bottom line in FIG. 2).

However, this choice is not mandatory. For the most diverse reasons, a completely different solution could be chosen, for instance a solution providing a signal CKOUT with a falling edge about at the centre of the bit period of signal DATA, or different choices yet. For this purpose it is possible to intervene on the switching logic of multiplexer 3, for instance by means of a logic network 60 (indicated in dashed line in FIG. 1 only) so as to effect a transcoding of the values of outputs Q of flip-flops 4 and 5 when transferring said outputs towards the inputs of multiplexer 3.

Logic network 60 could be of a selectively switchable type so as to effect different transcodings, thus varying the alignment condition between signal CKOUT and signal DATA. It is also clear for the person skilled in the art that a different phase or alignment relationship could be obtained by using as input signals for flip-flops 4 and 5 signals other than replicas CK3 and CK4 and/or by modifying the intervention logic of flip-flops 4 and 5, or yet by replacing said flip-flops with logic circuits of a different kind.

In any case, the basic operating principle of the device remains unchanged.

The diagram shown in FIG. 1 constitutes, as stated previously, a simplified model of the more complete circuit shown in FIG. 3.

Actually, the device according to the invention must take into account the fact that, for instance, clock signal CKIN may present a certain frequency error and that the circuit must be able to follow even rather wide phase fluctuations. It is also to be taken into account that both signal DATA and signal CKIN may undergo jitter and duty-cycle distortion phenomena. These and other disturbances can affect both the input signals and the circuit components, and the practical embodiment of the invention is to avoid the onset of output instability phenomena, for instance as an effect of repeated and/or sudden changes in output signal CKOUT arising from an equally repeated and/or sudden variation of the operating conditions of multiplexer 3.

A first instability phenomenon to be contrasted is the generation of undesired transitions on output signal CKOUT. This phenomenon could arise, for instance, if the choice of the output signal by multiplexer 3 should vary immediately close to an up or down transition of signal CKOUT previously generated: let it be assumed that, immediately after a rising edge on the "old" signal CKOUT, a modification of values SL0 and SL1 occurs (arising, for instance, from a drift in signal DATA) such as to induce a switching in multiplexer 3 resulting in the choice, as "new" signal CKOUT, of another replica CK1, CK2 . . . which at that moment has logic value "0"; in practice there would be an undesired rapid 0-1-0 transition at the output of device 1.

To remedy this drawback, the diagram shown in FIG. 3 comprises, in parallel to multiplexer 3, another multiplexer 30 of essentially identical structure, also driven by signals SL0, SL1: yet such signals, in this embodiment, are no longer the output signals of flip-flops 4 and 5, but are obtained from such output signals through a logic circuitry described further on. Moreover, the inputs of multiplexer 30 are connected to the outputs of module 2 so as to receive replicas CK1, CK2, CK3, CK4 according to a different configuration from that received by multiplexer 3. The specific connection configuration adopted in the exemplary embodiment shown can clearly be seen in FIG. 3. The overall result is to produce at the output of multiplexer 30 a signal, indicated as CKX, constituting a time-shifted replica of signal CKOUT. For instance, with reference to the diagram in FIG. 3, signal CKX has a 90° phase advance with respect to signal CKOUT aligned with signal DATA.

Signal CKX is fed to the enabling inputs CK of two D flip-flops 40 and 50, which respectively correspond with flip-flops 4 and 5: input D of flip-flop 40 receives output SL00 of flip-flop 4, whereas input D of flip-flop 50 receives output SL11 of flip-flop 5, through additional logic components (state machines 9, 10) better described further on. The outputs of flip-flops 40 and 50 are signals SL0 and SL1 controlling both multiplexer 3 and multiplexer 30. The arrangement is such that signals SL00, SL11 can propagate towards multiplexer 3 (determining, when necessary, a phase change in signal CKOUT) if and only when flip-flops 40 and 50 are enabled by signal CKX. In this way it is possible to make multiplexer 3 switch so as not to generate undesired transitions on signal CKOUT.

It is however evident that a signal like signal CKX, which is a phase-shifted replica (typically with a phase advance) of signal CKOUT, could also be generated in another way, by dispensing with multiplexer 30: for instance, it is possible to let signal CKOUT through a delay element and to use the signal upstream of the delay element itself as signal CKX.

Another phenomenon capable of inducing undesired phase shifts in signal CKOUT is jitter, which may affect signal CKIN and/or signal DATA. To avoid the negative effects of that phenomenon, in the diagram of FIG. 3 the output lines of module 2 conveying replicas CK3 and CK4 are connected to flip-flops 5 and 4, respectively, through two routes or paths. One path, indicated as 4a and 5a (respectively for flip-flop 4 and flip-flop 5) is a direct path, while the other, indicated as 4b and 5b (again, respectively for flip-flop 4 and flip-flop 5) is a delayed path, as the propagation of the related replica (CK4 and CK3) occurs through two cascaded delay elements D41 and D42 (for CK4) and D31 and D32 (for CK3).

It will be appreciated that one of the two cascaded delay elements (D41 and D31, respectively) is connected in the line conveying the replica (CK4 and CK3, respectively) from module 2 towards multiplexers 3 and 30 and the other one (D42, D32) is connected in the path of said replicas towards flip-flops 4 and 5. Two delay elements are used to take into account that delay elements D11 and D21 are also present on the lines conveying signals CK1 and CK2 from module 2 towards multiplexers 3 and 30. The presence of these delay elements is preferred in order to preserve the correct absolute time alignment between the various replicas of the clock signal and the data, also in consideration of the different paths travelled by these signals within the circuit.

Input D of flip-flop 4 may receive either the "direct" signal present on line 4a or the "delayed" signal present on line 4b. Similarly, input D of flip-flop 5 may receive either the direct signal present on line 5a or the delayed signal present on line 5b. The choice is materially effected by two switching elements 6, 7 (generally, two multiplexers) whose output lines 6a, 7a transfer towards flip-flops 4, 5, respectively, the signal present on path 4a or on path 4b, or respectively the signal present on path 5a or on path 5b, upon command of a common selection signal SL generated by a logic network 8 (in the embodiment shown, an EX-OR logic gate). The input signals of network 8 are signals SL0 and SL1 coming from outputs Q of flip-flops 40 and 50.

As it can be verified by analysing the logic behaviour of the components involved, the overall effect of multiplexers 6 and 7, of the delay elements associated thereto, and of logic network 8, is that of introducing in the operation of the device a hysteresis mechanism which prevents repeated phase shifts of output signal CKOUT in the presence of jitter. This result is obtained in the terms schematically shown in the bottom part of FIG. 2, i.e. by broadening the phase window in which the rising edge of signal DATA falls, with reference to the intervals in which signals CK3 and CK4 are sampled by that rising edge. For instance it can be seen that, when both signals SL0 and SL1 take logic value 1 (first bit of DATA in FIG. 2), multiplexers 6 and 7 driven by logic network 8 delay the falling edges of signal CK3 and advance the rising edges of signal CK4. Similarly, when signals SL0 and SL1 take logic values 1 and 0, respectively, the effect is to advance the falling edge of signal CK3 and to delay the falling edge of signal CK4. Lastly, when signals SL0 and SL1 take logic values 0 and 1 respectively the effect is to advance the rising edge of signal CK3 and to delay the rising edge of signal CK4. Note that the advance or delay of the rising edge is actually obtained with an advance or delay of the entire signal involved.

In practice, the sampling of the aforesaid signals by the rising edge of signal DATA takes place within a time window, indicated by A, which is broader than the one that would be provided by operating according to the basic set-up shown in FIG. 1.

The delay or the advance, and thus the width of the window A, are evaluated on the basis of the jitter values expected on signal DATA (for instance for an ATM stream at 25 MHz, jitter is in the order of 2 ns). When the rising edge of signal DATA is at the limit of a phase interval suitable for sampling and accidentally shifts into an adjacent interval because of jitter, the presence of the hysteresis mechanism described instantaneously widens the new phase interval used for sampling. In this way the rising edge of signal DATA lies at a position within an interval where jitter no longer is able to cause a phase shift. This can clearly be seen in FIG. 2.

As previously stated, using the rising edge of signal DATA for alignment purposes is one of the possible choices. The alignment could also be performed starting from the falling edge: in this case, the logic for generating the hysteresis mechanism described previously is adapted accordingly, in a manner which is well in the reach of the expert in logic circuit design.

References 9 and 10 indicate two modules each comprising a sequential logic network (or state machine) connected between flip-flop 4 and flip-flop 40 (module 9) and between flip-flop 5 and flip-flop 50 (module 10), respectively. Modules 9 and 10 simply act as checking or validating modules, allowing the propagation of new combinations of logic signals SL00, SL11 towards flip-flops 40 and 50 (in order to determine the subsequent phase change of signal CKOUT) only when these new combinations of values have occurred at the output of flip-flops 4 and 5 for a plurality, typically two, of successive rising edges of signal DATA. The latter in fact is transferred as an enabling signal (input CK) to modules 9 and 10, after passing through an inverter 11 which allows evaluating signal SL00 or SL11 in correspondence with the falling edge of DATA, thus without waiting for two transitions of said signal. A delay element 15 and another inverter 12 are connected in series to inverter 11 to compensate for the operating times of the various components in the device and to restore the logic value with which signal DATA was received.

Figure 4:
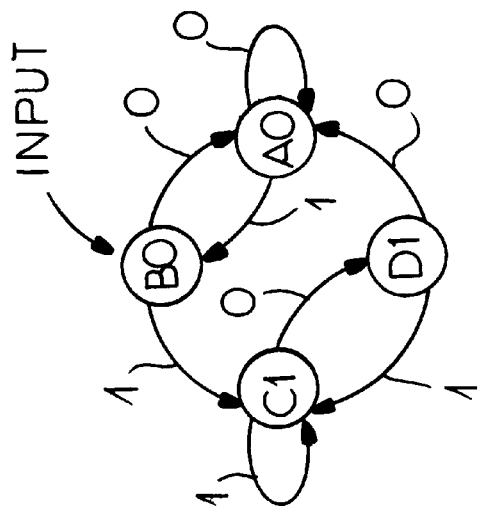
FIG. 4 is a state diagram of a circuit in FIG. 3.

FIG. 4 shows a possible state diagram of circuits 9, 10 in the example considered in which new combinations of logic values of signals SL00 or SL11 are forwarded towards flip-flops 40, 50 (i. e. are validated) only after these new combinations have been recognised in correspondence of two successive transitions of signal DATA. The circuits present four states A0, B0, C1, D1. States A0, C1 are taken when the new value (respectively 0 and 1) of signals SL00 and SL11 has been validated. States B0 and D1 instead are taken when the logic value of the input signal has changed with respect to the previous transition of DATA. State B0 also is the input state, taken at the start of the operations. Arrows 0, 1 represent transitions determined by logic value 0 or respectively 1 of the input signal. It can immediately be seen that the diagram shown corresponds to the desired operation of circuits 9, 10. Note that, thanks to the presence of input state B0, at the start of operations signals SL00, SL11 are forwarded towards flip-flops 40, 50 at the first transition of signal DATA. Under these conditions waiting for the second transition would be useless. Given the diagram, the person skilled in the art has no problem in designing the circuits.

Lastly, reference 13 designates a processing block which is responsive, as are modules 9 and 10 and flip-flops 40 and 50, to a reset signal for the device 1 applied through an input line indicated as 14. Block 13 also receives signal DATA as well as two signals VAR1 and VAR2, coming from respective outputs of modules 9 and 10 and generated in correspondence with variations in the signals transferred from fip-flops 4 and 5 towards flip-flops 40 and 50, i.e. when the information causing the phase variation of the signal CKOUT is transferred towards flip-flop 40 and 50.

Block 13 therefore performs a twofold function. The first function is to emit a signal OK validating the outgoing clock signal CKOUT, following a reset of device 1, only in correspondence with the second rising edge of signal DATA received by the circuit (i.e. only when outgoing clock signal CKOUT has the correct phase). The second functions to remove the validation signal when a phase shift, likely induced by a transmission malfunction upstream of the circuit, occurs. To this aim, block 13 continuously checks signals VAR1 and VAR2 coming from modules 9 and 10: in case of a 180° phase shift, these variation signals are activated simultaneously and as a consequence, in the presence of this condition, block 13 removes the validation signal.

Of course, keeping unaltered the principle of the invention, the details and the embodiments may be widely varied with respect to what has been described and shown, without thereby departing from the scope of the present invention.

We claim:

1. A device for the time alignment of a clock signal and a data signal (DATA) essentially isochronous with the clock signal comprising:

phase shifting means generating a set of replicas (CK1–CK4) of said clock signal, said replicas (CK1–CK4) being separated from one another by given phase differences;

sampling means activated by said data signal (DATA) and detecting, in correspondence with given transitions of bits of said data signal (DATA), the logic values taken by at least a subset of said replicas (CK1–CK4) and to generate a respective combination of logic signals (SL0, SL1), and first selecting means which receive as inputs said replicas (CK1–CK4) of said clock signal and which are arranged to select one of said replicas (CK1–CK4), identified starting from said combination of logic signals (SL0, SL1), as an output clock signal (CKOUT) aligned in time with said data signal (DATA).

2. The device claimed in claim 1 wherein said sampling means are arranged to detect the logic values taken by a subset (CK3, CK4) of said replicas (CK1–CK4) entropically representative of the whole set of replicas (CK1–CK4).

3. The device claimed in claim 2 wherein said logic signals (SL0, SL1) correspond to the values assumed by the replicas (CK3, CK4) of said subset.

4. The device claimed in claim 1 wherein said sampling means are activated by rising edges of said data signal (DATA).

5. The device claimed in claim 4 wherein said data signal (DATA) is an NRZ signal and operation of said sampling means is enabled in correspondence with transitions of said data signal (DATA) towards a level different from 0.

6. The device claimed in claim 1 wherein said first selecting means are so configured as to select, as said output clock signal (CKOUT), the replica (CK1–CK4) having a respective transition in an essentially central position with respect to the bit period of said data signal (DATA).

7. The device claimed in claim 1 wherein said first selecting means comprise a multiplexer which receives at its input said replicas (CK1–CK4) and is driven by the logic signals (SL0, SL1).

8. The device claimed in claim 1 wherein said first selecting means comprise latch circuits which receive at their input respective replicas (CK3–CK4) of said set and are enabled to operate by said data signal (DATA), the outputs of said latch circuits defining said logic signals (SL0, SL1).

9. The device claimed in claim 1 which further comprises processing means arranged to generate a time-offset replica (CKX) of said output clock signal (CKOUT), as well as transfer circuits enabled by said time-offset replica (CKX) of said output clock signal (CKOUT) to transfer said logic signals (SL0, SL1) towards said first selecting means so as to modify the choice of said output clock signal (CKOUT) only in correspondence with a predetermined transition of said time-offset replica (CKX) of said output clock signal (CKOUT).

10. The device claimed in claim 9 wherein said processing means generate a time-offset replica (CKX) of said output clock signal (CKOUT) which has a phase advance with respect to the output clock signal (CKOUT).

11. The device claimed in claim 10 wherein said processing means generate a time-offset replica (CKX) of said output clock signal (CKOUT) which has, with respect to said output clock signal (CKOUT), an advance equal to said given phase differences.

12. The device claimed in claim 9 wherein said transfer circuits comprise additional bistable circuits which receive a respective one of said logic signals (SL0, SL1) and are enabled by said time-offset replica (CKX) of said output clock signal (CKOUT), whereby said logic signals (SL0, SL1) are present on the outputs of said additional bistable circuits in combinations which vary only in correspondence with said given transition of said time-offset replica (CKX) of said output clock signal (CKOUT).

13. The device claimed in claim 9 wherein said processing means comprise second selecting means which receive said replicas (CK1–CK4) in a combination other than that received by said first selecting means.

14. The device claimed in claim 1 which further comprises hysteresis generating means (D31, D41, D42, 6, 7, 8) acting on the replicas (CK3, CK4) transferred towards said sampling means, to selectively increase a duration (A) of time intervals in which said replicas (CK3, CK4) are subjected to the action of said sampling means.

15. The device claimed in claim 14 wherein said hysteresis generating means (D31, D41, D42, 6, 7, 8) comprise two respective propagation paths (4a, 5a, 5b) towards said sampling means for each replica (CK3, CK4) they act upon, at least one (5b) of said paths including phase-shifting means, said (D31, D41, D42), further comprising additional selecting means that are driven starting from said logic signals (SL0, SL1) to selectively activate either of said propagation paths (4a, 5a, 5b).

16. The device claimed in claim 15 wherein between said sampling means and said first selecting means there are interposed validation means which, in the presence of a variation of said combination of logic signals (SL0, SL1), allow the propagation of the varied combination of logic signals (SL0, SL1) towards said first selecting means only after said variation has been detected in correspondence with a plurality of consecutive ones of said given transitions of said data signal (DATA).

17. The device claimed in claim 16 wherein said validation means allow the propagation of the varied combination of logic signals (SL0, SL1) only after said variation has been detected in correspondence with two successive transitions of said data signal (DATA).

18. The device claimed in claim 16 wherein said validation means comprise a state machine.

19. A method of aligning in time a clock signal (CKIN) and a data signal (DATA) essentially isochronous with said clock signal, said method comprising the steps of:

generating a set of replicas (CK1–CK4) of said clock signal (CKIN), said replicas (CK1–CK4) being separated from one another by given phase differences;

detecting, in correspondence with given transitions of said data signal (DATA), the logic values taken by at least a subset of said replicas (CK1–CK4), and generating a respective combination of logic signals (SL0, SL1); and selecting one of said replicas (CK1–CK4) of said clock signal (CKIN), identified starting from said combination of logic signals (SL0, SL1), as an output clock signal (CKOUT) aligned in time with said data signal (DATA).

20. The method claimed in claim 19 wherein the logic values taken by a subset (CK3, CK4) of said replicas entropically representative of the replicas (CK1–CK4) themselves are detected, and said output clock signal is selected on the basis of the combination of the logic values taken by the replicas (CK3, CK4) of said subset.

21. The method claimed in claim 20 wherein a time-offset replica (CKX) is generated with a phase advance, with respect to said output clock signal (CKOUT), essentially equal to said given phase differences.

22. The method claimed in claim 21 wherein said detecting step comprises the step of submitting at least the replicas in said subset to a hysteresis function to selectively increase a duration (A) of a time interval allotted to said detecting step.

23. The method claimed in claim 22 which further comprises the steps of:

generating two time shifted versions of each replica (CK3, CK4) submitted to hysteresis and detecting the logic value of each of said replica starting from either of said time shifted versions, depending on said combination of logic values (SL0, SL1).

24. The method claimed in claim 23 which further comprises the step of modifying the choice of said output clock signal (CKOUT) only after the detection of a variation of said combination of logic values (SL0, SL1) in correspondence with a plurality of consecutive ones of said given transitions of said data signal (DATA).

25. The method claimed in claim 24 wherein the plurality of transitions comprises two of the consecutive transitions.

26. The method claimed in claim 19 wherein the rising edges of the data signal (DATA) are used as given transitions of said data signal (DATA).

27. The method claimed in claim 26 which further comprises the step of selecting, as said output signal (CKOUT), the replica (CK1–CK4) having a respective transition in an essentially central position with respect to the bit period of said data signal (DATA).

28. The method claimed in claim 27 wherein said detecting step further comprises the steps of:

feeding said at least some of the said replicas (CK3, CK4) to respective inputs of sampling circuits, and using said given transitions of said data signal (DATA) as a signal for enabling said sampling circuits, whereby the outputs of said sampling circuits define said logic values (SL0, SL1).

29. The method claimed in claim 28 which further comprises the steps of:

generating a time-offset replica (CKX) of said output clock signal (CKOUT), and modifying the choice of said output clock signal (CKOUT) only in correspondence with a given transition of said time-offset replica (CKX) of said output clock signal (CKOUT).

30. The method claimed in claim 29 wherein said time-offset replica (CKX) of said output clock signal (CKOUT) is generated as a time-offset replica having a phase advance.

* * * * *